(12) United States Patent
Maruyama et al.

(10) Patent No.: US 8,391,111 B2
(45) Date of Patent: Mar. 5, 2013

(54) OPTICAL PICKUP CONTROL CIRCUIT AND OPTICAL DISC DRIVE DEVICE

(75) Inventors: Takao Maruyama, Kanagawa (JP); Muneyuki Horiguchi, Kanagawa (JP); Hitoshi Sakaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/154,779

(22) Filed: Jun. 7, 2011

(65) Prior Publication Data

US 2011/0305123 A1 Dec. 15, 2011

(30) Foreign Application Priority Data

Jun. 14, 2010 (JP) ................................. 2010-135614

(51) Int. Cl.
*G11B 7/00* (2006.01)
(52) U.S. Cl. .................................. 369/44.29; 369/44.32
(58) Field of Classification Search ............... 369/53.19, 369/44.32, 44.29, 44.35, 44.36, 44.42
See application file for complete search history.

(56) References Cited

U.S. PATENT DOCUMENTS

| | | | | |
|---|---|---|---|---|
| 6,498,772 | B1* | 12/2002 | Fujiune et al. ............. | 369/44.32 |
| 2001/0055255 | A1* | 12/2001 | Ma et al. .................... | 369/53.19 |
| 2002/0006091 | A1* | 1/2002 | Ma et al. .................... | 369/44.35 |
| 2004/0076091 | A1* | 4/2004 | Yonezawa .................. | 369/44.29 |
| 2009/0040905 | A1* | 2/2009 | Murakami et al. ........ | 369/112.23 |
| 2010/0202258 | A1* | 8/2010 | Huh et al. .................. | 369/44.32 |

FOREIGN PATENT DOCUMENTS

JP 2003-022552 A 1/2003

* cited by examiner

*Primary Examiner* — Thang Tran
(74) *Attorney, Agent, or Firm* — Wolf, Greenfield & Sacks, P.C.

(57) ABSTRACT

An optical pickup control circuit includes an adding portion that adds a tracking driving signal which is for moving an objective lens, provided to face a discoid optical information recording medium, in a tracking direction of the corresponding optical information recording medium, to a tilt driving signal which is for moving the corresponding objective lens in a tilt direction of the corresponding optical information recording medium, and supplies the signal to a tilt actuator.

10 Claims, 9 Drawing Sheets

PRIOR ART

OPTICAL PICKUP CONTROL CIRCUIT AND OPTICAL DISC DRIVE DEVICE

BACKGROUND

The present disclosure relates to an optical pickup control circuit and optical disc drive device for suppressing oscillation in the tilt direction at the time of reproducing an optical information recording medium.

In the optical disc drive device, the focus actuator performs tracking for surface wobbling of an optical disc, and the tracking actuator performs tracking for the eccentricity of the optical disc, and the tilt actuator corrects (adjusts) the tilt of the optical disc with respect to the optical axis.

For the focusing and the tracking, a feedback control is performed by generating an error signal from the returning light from the optical disc. In contrast, for the tilt, a feed forward control is generally performed since it is difficult to detect the tilt thereof from the returning light. Further, it is the premise that the optical axis is structurally fixed at a certain tilt by a spindle motor. From this premise, it has been considered that the feed forward control is enough for the tilt. Hence, when oscillation additionally acts on the tilt actuator, it is difficult to cancel the oscillation, and it is also difficult to optimally correct the tilt of the optical disc. Accordingly, in order for the resonance frequency f0 of the tilt actuator not to be affected by the oscillation caused by the surface wobbling and the eccentricity of the optical disc, it is necessary for the frequency f0 to be a sufficiently high frequency relative to the rotational cycle of the optical disc.

However, in recent years, there have been advances in the reduction in size and thickness of the notebook PC, in which an optical disc drive device is built. Thus, there has been demand to reduce the size and the thickness of the optical disc drive device. As the size and the thickness of the optical disc drive device have been reduced, the size and the thickness of the optical pickup device have also been reduced. As a result, the tilt actuator is restricted, and thus it is difficult to set a sufficiently high resonance frequency f0.

As described above, in the case where it is difficult to set the resonance frequency f0 of the tilt actuator to be sufficiently high, it is necessary to make the centroid of the actuator coincide with the operation point in the focusing direction or the tracking direction. In particular, in order for oscillation in the tracking direction not to have influence on the tilt direction, it is necessary to make the operation point of the tracking accurately coincide with the centroid of the actuator (refer to FIGS. 12A and 12B). Hence, strict restrictions are necessary for the precision of the actuator components and for the operations at the time of manufacture.

As shown in FIG. 12A, in the case where there is deviation between the centroid of the actuator and the tracking operation point, thrust (torque) occurs in the tilt direction centered on the centroid thereof. In contrast, as shown in FIG. 12B, in the case where the centroid of the actuator and the tracking operation point coincide with each other, there is no thrust in the tilt direction, and the actuator becomes stable.

Japanese Unexamined Patent Application Publication No. 2003-22552 discloses an optical pickup device that controls oscillation in the tilt direction. In the optical pickup device, as shown in FIG. 2, tilt magnets 14a and 14b are provided in a lens holder 10, and tilt coils for tilting an objective lens 1 are provided at the positions opposed to the corresponding tilt magnets 14a and 14b. In addition, the tilt of the objective lens 1 in the radial direction of the optical disc is controlled by the current for correction applied to the tilt coils, thereby reducing the AC tilt.

SUMMARY

However, the optical pickup device disclosed in Japanese Unexamined Patent Application Publication No. 2003-22552 is provided with a detection control section (not shown in the drawing) that detects an inverse voltage of the tilt coils generated in accordance with the tilt of the objective lens in the radial direction of the optical disc.

The disclosure has been made in view of the above situation, and addresses the issue of suppressing oscillation in the tilt direction without being provided with the detection section therefor even when the resonance frequency of the tilt actuator is close to the rotation frequency of the optical information recording medium.

According to an embodiment of the disclosure, an optical pickup control circuit includes an adding portion that adds a tracking driving signal which is for moving an objective lens, provided to face a discoid optical information recording medium, in a tracking direction of the corresponding optical information recording medium, to a tilt driving signal which is for moving the corresponding objective lens in a tilt direction of the corresponding optical information recording medium, and supplies the signal to a tilt actuator.

Further, according to another embodiment of the disclosure, an optical disc drive device includes: an objective lens that is provided to face a discoid optical information recording medium; a tracking actuator; a tracking driving section; a tilt actuator; a tilt driving section; and a tilt oscillation suppressing section.

The tracking actuator moves the objective lens in a tracking direction of the optical information recording medium. The tracking driving section generates a tracking driving signal for moving the objective lens in the tracking direction of the optical information recording medium and supplies the signal to the tracking actuator.

Further, the tilt actuator moves the objective lens in a tilt direction of the optical information recording medium. The tilt driving section generates a tilt driving signal for moving the objective lens in the tilt direction of the optical information recording medium.

In addition, the tilt oscillation suppressing section generates a tilt oscillation suppression signal by adding the tracking driving signal, which is generated in the tracking driving section, to the tilt driving signal, which is generated in the tilt driving section, and supplies the signal to the tilt actuator.

According to the embodiments of the disclosure, by using first order correlation between the tracking driving signal and the tilt driving signal, the tracking driving signal is added to the tilt driving signal, thereby supplying the added signal to the tilt actuator. Thereby, even in the case where the resonance frequency of the tilt actuator is close to the rotation frequency of the optical information recording medium, the tilt oscillation caused by the tracking oscillation is suppressed.

According to at least one embodiment of the disclosure, even in the case where the resonance frequency of the tilt actuator is close to the rotation frequency of the optical information recording medium, it is possible to suppress the oscillation in the tilt direction without providing the detection section therefor.

BRIEF DESCRIPTION OF THE DRAWINGS

FIG. 7A shows a case of using a standard disc, and FIG. 7B shows a case of using a disc with an eccentricity of 100 μm;

FIG. 10A shows a case of a DVD-ROM and FIG. 10B shows a case of a DVD+RW;

DETAILED DESCRIPTION OF EMBODIMENTS

Hereinafter, examples of preferred embodiments for carrying out the disclosure will be described with reference to the accompanying drawings. The description will be given in the order of the following items. It should be noted that common members in the respective drawings are represented by the same references and numerals.

1. Embodiment (Tilt Oscillation Suppressing Section: Example Where Tracking Driving Signal Is Added to Tilt Driving Signal)
2. Others 1. Embodiment (Exemplary Configuration of Optical Disc Drive Device)

Figure 1:
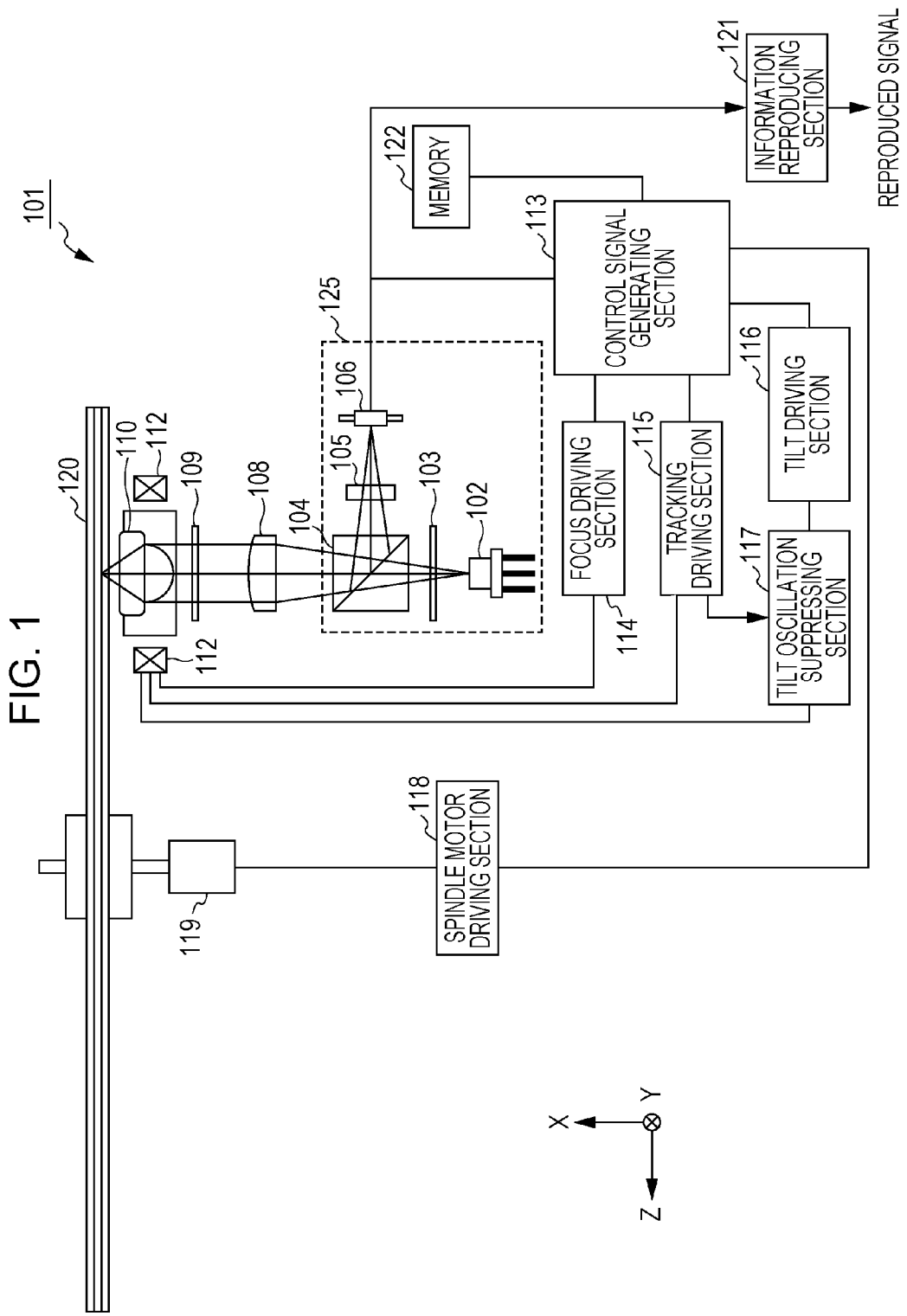
FIG. 1 is a block diagram illustrating an exemplary configuration of an optical disc drive device according to an embodiment of the disclosure.
Figure 2:
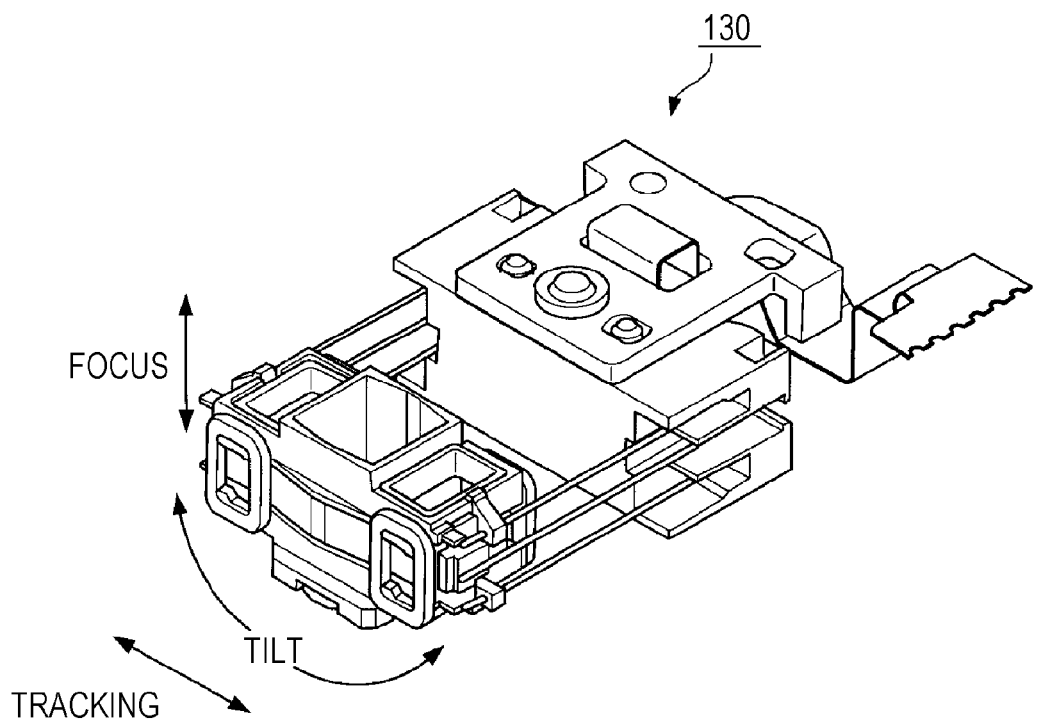
FIG. 2 is an exterior perspective view of an example of the optical pickup device.

FIG. 1 is a block diagram illustrating an exemplary configuration of an optical disc drive device according to an embodiment of the disclosure. FIG. 2 is an exterior perspective view of an example of the optical pickup device.

An optical disc drive device 101 includes an optical pickup device 130 for reading out information from a discoid optical information recording medium 120. The optical pickup device 130 includes an optical system formed of an integration unit 125, a collimator lens 108, a ¼ wavelength plate 109, an objective lens 110, an actuator 112, and the like. The optical pickup device 130 further includes a control signal generating section 113.

Further, the optical disc drive device 101 includes, in addition to the configuration of the above-mentioned optical pickup device 130, a focus driving section 114, a tracking driving section 115, a tilt driving section 116, a tilt oscillation suppressing section 117, a spindle motor driving section 118, a spindle motor 119, an information reproducing section 121, and the like.

The integration unit 125 includes a semiconductor laser 102, a photodetector 106, a diffraction grating 103, a beam splitter 104, and a multi-lens 105. The beam splitter 104 separates light, which is emitted from the semiconductor laser 102, and light which is reflected from the optical information recording medium 120 to be described later.

The light, which is emitted from the semiconductor laser 102 and is diffracted by the diffraction grating 103, is transmitted through the beam splitter 104, and is changed into substantially parallel light through the collimator lens 108. The polarization direction of the linearly polarized light, which is emitted from the semiconductor laser 102 and is transmitted through the collimator lens 108, is converted into circular polarization by the ¼ wavelength plate 109. Thereafter, the light is condensed by the objective lens 110, is transmitted through a light transmissive layer of the optical information recording medium 120, and is condensed on the information recording surface.

The circularly polarized light, which is reflected from the information recording surface of the optical information recording medium 120, is linearly polarized by the ¼ wavelength plate 109 in a direction orthogonal to the linearly polarized light which is emitted from the semiconductor laser 102.

The light, which is reflected from the optical information recording medium 120, is changed into substantially parallel light by the objective lens 110, and is deflected by the beam splitter 104 in the −Z axis direction. Then, the light is condensed on the photodetector 106 by the collimator lens 108 and the multi-lens 105.

The light, which is reflected from the information recording surface of the optical information recording medium 120, is linearly polarized in the direction orthogonal to the linearly polarized light which is emitted from the semiconductor laser 102. Accordingly, due to the difference of the polarization direction, the light is separated by the beam splitter 104, and is incident on the photodetector 106.

In addition, in order to concentrate the light on the target track of the optical information recording medium 120, the objective lens 110 is driven together with a fixed holder (not shown in the drawing). The objective lens 110 is driven by the actuator 112 in the focusing direction (the X axis direction) of the optical information recording medium 120 and in the tracking direction (the Z axis direction) orthogonal to the track of the optical information recording medium 120. The driven movement amount is detected by the photodetector 106, and is controlled by a focusing error signal and a tracking error signal which are calculated by the control signal generating section 113.

The control signal generating section 113 generates not only the focusing error signal and the tracking error signal, but also a tilt control signal, a spindle motor control signal, and the like. Further, an RF signal is generated by the information reproducing section 121, and is extracted as a reproduced signal.

The memory 122 is a non-volatile storage section that stores a resultant which is calculated by the control signal generating section 113, setting information, computer programs such as firmware, and the like. An example thereof is a semiconductor memory. Examples of the setting information include: a first order coefficient k of the gain of the rotation frequency of the optical information recording medium 120; information for determining the polarity of the tilt driving signal for each individual through the tilt oscillation suppressing section 117 (refer to FIG. 4) to be described later.

The focus driving section 114 controls the amount of movement of the actuator 112 in the focusing direction on the basis of the focusing error signal which is output from the control signal generating section 113. Further, the tracking driving section 115 controls the amount of movement of the actuator 112 in the tracking direction on the basis of the tracking error signal which is output from the control signal generating section 113. The spindle motor driving section 118 controls the rotation speed of the spindle motor 119 on the basis of the spindle motor control signal which is output from the control signal generating section 113. In the embodiment, a DSP (Digital Signal Processor) is applied to the focus driving section 114, the tracking driving section 115, the tilt driving section 116 to be described later, and the spindle motor driving section 118.

The tilt driving section 116 controls the amount of movement of the actuator 112 in the tilt direction on the basis of the tilt control signal which is output from the control signal generating section 113. In addition, the tilt oscillation suppressing section 117 outputs the tilt oscillation suppression signal for suppressing oscillation in the tilt direction on the basis of the tilt driving signal, which is output from the tilt driving section 116, and the tracking signal, which is output from the tracking driving section 115, thereby supplying the signal to the actuator 112.

The actuator 112 includes a magnetic circuit constituted of a yoke and a magnet, and a coil disposed on the magnetic circuit. The respective actuators 112 are provided for focus adjustment, tracking adjustment, and tilt adjustment in order to control the respective amounts of movement in the focusing direction, the tracking direction, and the tilt direction.

Hereinafter, a description will be given of oscillation in the tilt direction and oscillation in the tracking direction caused by the eccentricity of the optical information recording medium.

Figure 3:
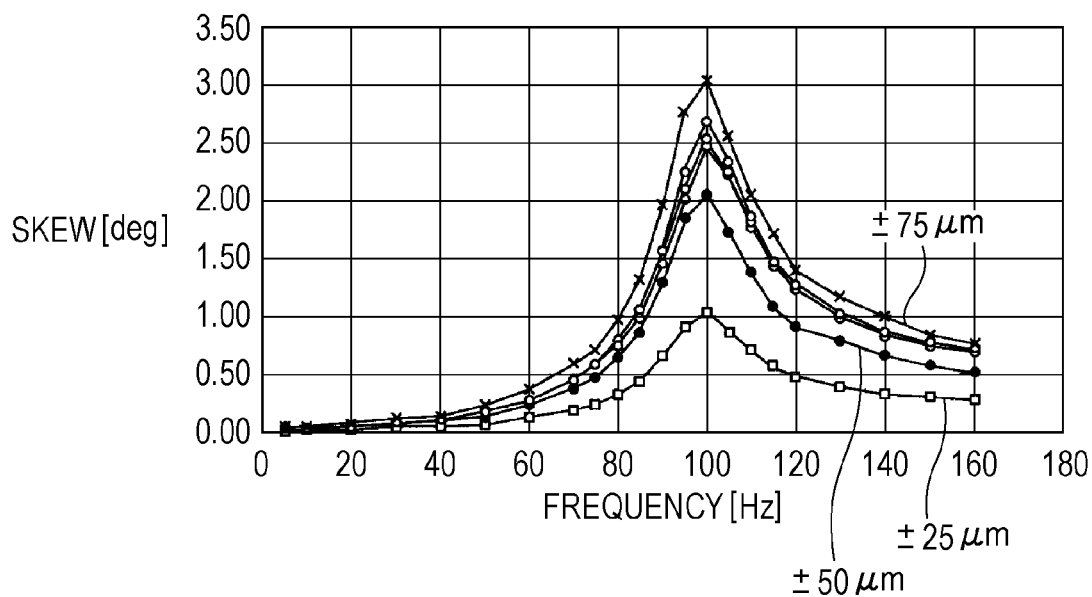
FIG. 3 is a graph illustrating a tilt variation caused by oscillation in the tracking direction.

FIG. 3 is a graph illustrating a feature (tilt variation) of resonance generated in the tilt by the oscillation in the tracking direction caused by eccentricity.

The example of FIG. 3 shows, for the actuator in which the resonance frequency f0 of the tilt oscillation is 100 Hz, the resultant of measurement as to how much wobble (tilt) is caused in the tilt direction by applying oscillation corresponding to various eccentricities of the optical information recording medium in the tracking direction.

As shown in FIG. 3, it would appear that, as the amplitude of the oscillation in the tracking direction is changed, a value of Q representing an amplitude increase coefficient is changed in proportion to the magnitude of the eccentricity, that is, the magnitude of the oscillation. The tilt control is generally a feed forward control, and it is difficult for the system to detect the condition of the oscillation through the control. However, since the oscillation in the tilt direction is changed in conjunction with the oscillation in the tracking direction, on the basis of the condition of the oscillation in the tracking direction, it is possible to know the condition of the oscillation in the tilt direction. Therefore, when a certain coefficient is applied to the tracking driving signal and the signal is supplied to the tilt actuator, it can be said that it is possible to suppress the tilt oscillation.

Exemplary Configuration of Tilt Oscillation Suppressing Section

Figure 4:
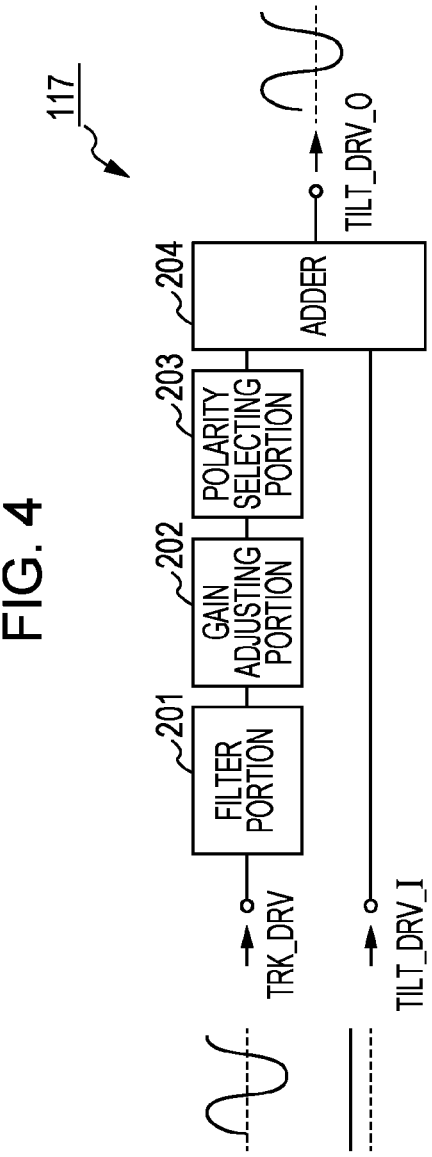
FIG. 4 is a block diagram illustrating an internal configuration of a tilt oscillation suppressing section.

FIG. 4 is a block diagram illustrating an internal configuration of the tilt oscillation suppressing section 117.

The tilt oscillation suppressing section 117 is an example of the optical pickup control circuit. The tilt oscillation suppressing section 117 includes a filter portion 201, a gain adjusting portion 202, a polarity selecting portion 203, and an adder 204, and is operated in accordance with the control of the control signal generating section 113.

The filter portion 201 is a circuit that extracts a signal with a frequency component near the resonance frequency f0 from the tracking driving signal (TRK_DRV) which is supplied from the tracking driving section 115, and it is possible to employ, for example, a band pass filter as the filter portion 201.

The tilt oscillation occurs only near the resonance frequency f0, and thus the original tracking driving signal (TRK_DRV) includes a frequency component which is not available to suppress the tilt oscillation. That is, the tracking driving signal (TRK_DRV) has a broad frequency band in order to cope with scratches and the like on the information recording surface of the optical information recording medium 120. This leads to wasteful power consumption and heat generation. Accordingly, the filter portion 201 extracts only the frequency component near f0 from the tracking driving signal (TRK_DRV). Further, the filter portion 201 may adaptively change a cut-off frequency in accordance with the rotation frequency information of the optical information recording medium 120 supplied from the control signal generating section 113.

The gain adjusting portion 202 is a circuit that adjusts the gain of the tracking driving signal which is output from the filter portion 201.

The tracking driving signal near the resonance frequency f0 is mainly for suppressing the eccentricity component of the optical information recording medium 120, and the frequency depends on the rotation cycle of the optical information recording medium 120. However, the amplitude of the tracking driving signal (TRK_DRV) depends on the amount of eccentricity of the optical information recording medium 120, and is constant independent of the frequency thereof. Accordingly, when the tracking driving signal (TRK_DRV) is used as the tilt driving signal as it is, at the frequency deviated from the resonance frequency f0, the tilt oscillation is over-corrected. Further, the coefficient of correlation between the tracking driving and the tilt driving is changed in accordance with a state in which the centroid of the optical pickup device is deviated from the tracking driving center (the operation point), variations in the components of the actuators, and the like occur. Therefore, the coefficient is not uniquely defined, and for each individual, it is necessary to change the coefficient whenever the optical information recording medium 120 is exchanged. For this reason, the gain adjusting portion 202 is necessary. The gain adjusting portion 202 appropriately adjusts the gain of the tracking driving signal in accordance with the rotation frequency information of the optical information recording medium 120 supplied from the control signal generating section 113.

The polarity selecting portion 203 is a circuit that selects the polarity of the tracking driving signal which is output from the gain adjusting portion 202.

Since the polarities of the tracking driving and the tilt driving vary depending on the system, it is preferable to select the polarity of the tracking driving signal added to the tilt driving signal. For example, in a case of rightward eccentricity at a certain time, toward which direction the tilt is inclined differs in accordance with the optical pickup device. The information, which determines the polarity depending on the position of the centroid of the tilt actuator, may be set in advance on the basis of design information of the optical pickup device and be stored in the memory 122, or may be set in accordance with the actual behavior thereof. In the case of performing the setting in accordance with the actual behavior, it is possible to reliably set the polarity without error. Such information for determining the polarity of the tilt driving signal is stored in the memory 122 for each individual. Then, the polarity selecting portion 203 selects the polarity with reference to the information.

The adder 204 is a circuit that adds the tracking driving signal, which is output from the polarity selecting portion 203, to the tilt driving signal (TILT_DRV_I), and is an example of the adding portion.

After each processing section performs processing on the tracking driving signal, the signal is added to the tilt driving signal (TILT_DRV_I), whereby it is possible to generate a control signal (a tilt oscillation suppression signal: TILT_DRV_O) for suppressing the tilt oscillation. Then, the tilt oscillation suppression signal (TILT_DRV_O) is supplied to the actuator 112 (the tilt actuator).

The tilt oscillation suppressing section 117 can be formed by modifying hardware such as the existing IC (Integrated Circuit) chip or by newly adding the IC chip. Therefore, it is not necessary to change the mechanical structure of the optical pickup device.

Figure 5:
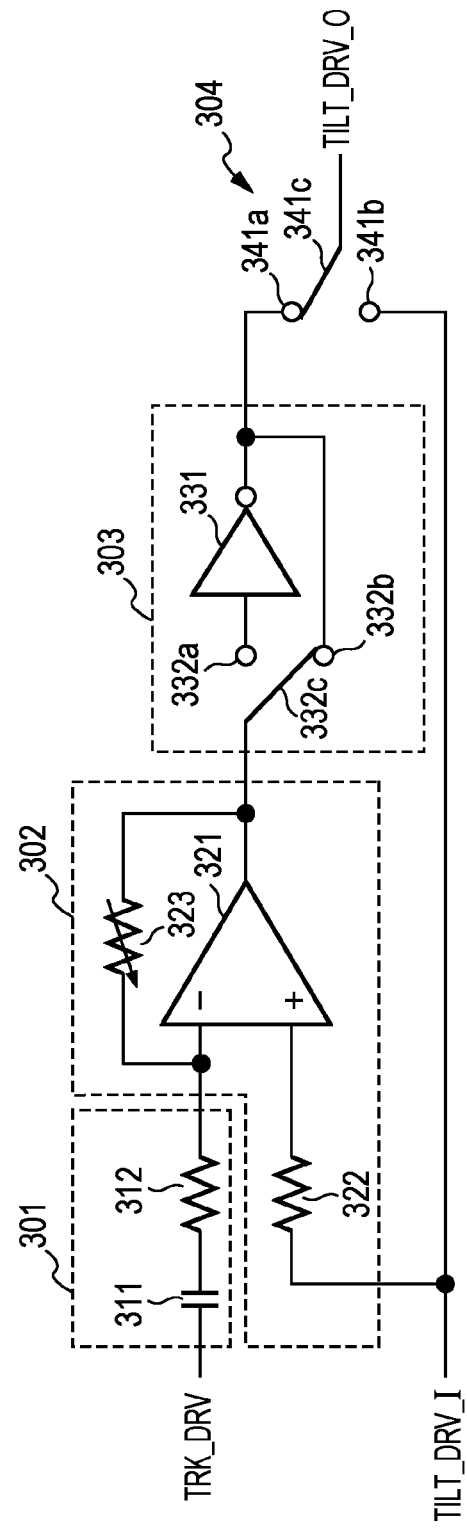
FIG. 5 is an electric circuit diagram illustrating an example of the tilt oscillation suppressing section.

FIG. 5 is an electric circuit diagram illustrating an example of the tilt oscillation suppressing section.

The tilt oscillation suppressing section shown in FIG. 5 mainly includes a high-pass filter portion 301, a gain adjustment adding portion 302, a polarity selecting portion 303, and a switching portion 304.

The high-pass filter portion 301 is a specific example of the filter portion 201, and is configured such that the resistance element 312 is connected in series to the capacitive element 311. The high-pass filter portion 301 passes the signal of a frequency band higher than that of the signal including the resonance frequency f0 between the tracking driving signals (TRK_DRV), and outputs the signal to the gain adjustment adding portion 302. In addition, in the example of FIG. 5, the high-pass filter portion 301 is employed as a specific example of the filter portion 201, but it is apparent that the filter portion is not limited to this form.

The gain adjustment adding portion 302 includes an operational amplifier 321, a resistance element 322, and a variable resistance element 323. A non-inverting input terminal of the operational amplifier 321 is connected to the tilt driving section 116 through the resistance element 322, and an inverting input terminal thereof is connected to the resistance element 312 of the high-pass filter portion 301. The inverting input terminal and an output terminal thereof are connected by the variable resistance element 323. The gain of the signal, which is input from the high-pass filter portion 301 to the inverting input terminal of the operational amplifier 321, is adjusted by the variable resistance element 323. Then, the signal is added to the tracking driving signal (TILT_DRV_I) which is input to the inverting input terminal of the operational amplifier 321 through the resistance element 322, and is thereby output to the polarity selecting portion 303.

The polarity selecting portion 303 includes a phase inverting element 331, contact terminals 332a and 332b, and a movable segment 332c. The input terminal of the phase inverting element 331 is connected to the contact terminal 332, and the output terminal thereof is connected to the contact terminal 332b. In addition, one end of the movable segment 332c is connected to the output terminal of the operational amplifier 321 of the gain adjustment adding portion 302. The movable segment 332c is moved between the contact terminal 332a and the contact terminal 332b, thereby inverting the phase of the signal, which is output from the gain adjustment adding portion 302, and newly changing the polarity.

The switching portion 304 includes contact terminals 341a and 341b, and a movable segment 341c. The contact terminal 341a is connected to the output terminal of the phase inverting element 331 of the polarity selecting portion 303, and the contact terminal 341b is connected to the tilt driving section 116. In addition, the movable segment 341c is moved between the contact terminal 341a and the contact terminal 341b, thereby switching whether to output the signal (TILT_DRV_O) which is obtained by adding the tracking driving signal subjected to a predetermined processing to the tilt driving signal (TILT_DRV_I) or to output the tilt driving signal (TILT_DRV_I) as it is.

Gain Adjustment Processing

In the optical disc drive device 101, in the case of using the tilt oscillation suppressing section 117, as described above, there are individual variation of the optical pickup devices and variation in the amount of eccentricity of the optical information recording medium 120. Hence, it is necessary to adjust the gain applied to the tracking driving signal. The adjustment method will be described as follows.

Figure 6:
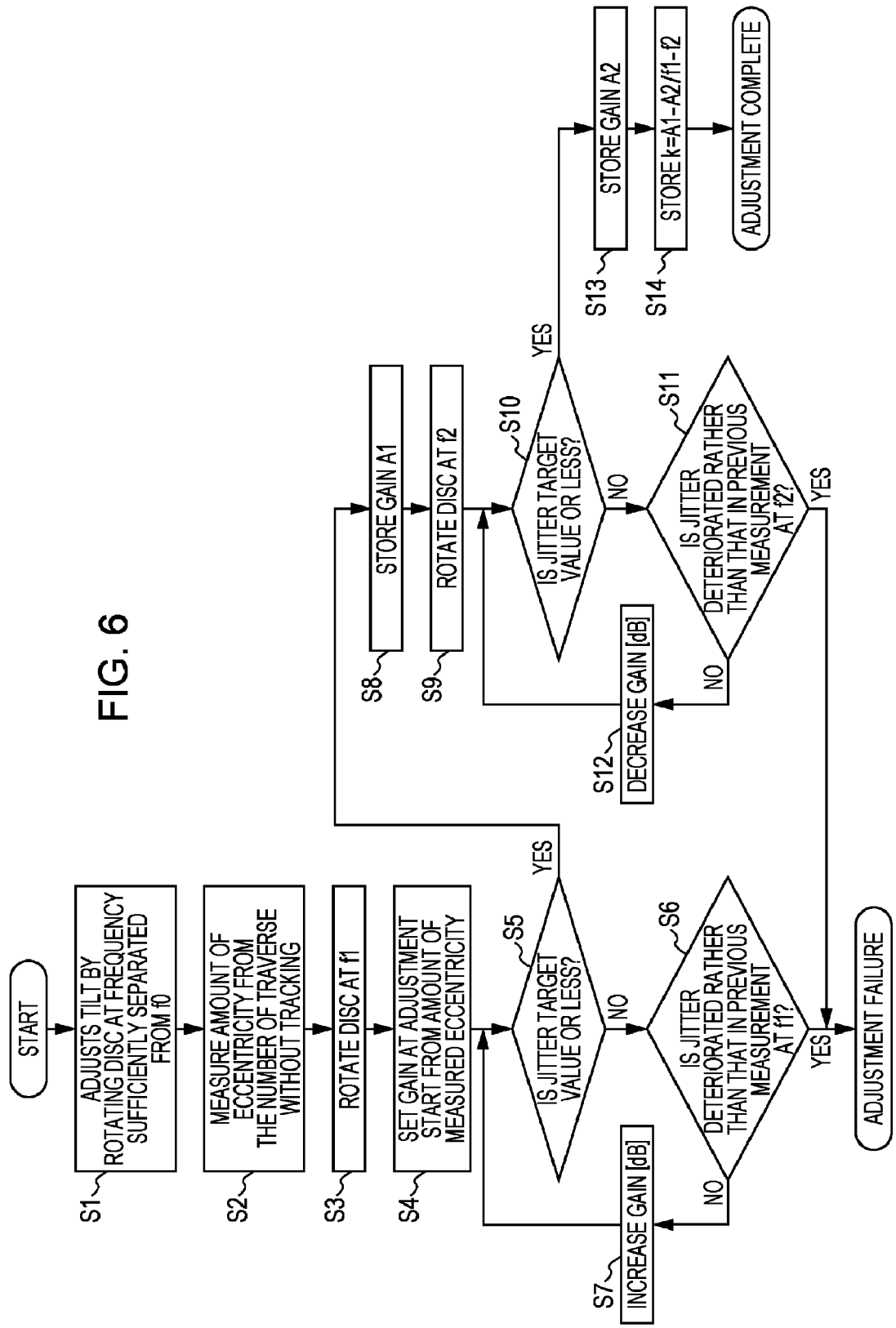
FIG. 6 is a flowchart illustrating gain adjustment processing performed by a gain adjusting portion.

FIG. 6 is a flowchart illustrating gain adjustment processing performed by a gain adjusting portion.

First, the control signal generating section 113 rotates the optical information recording medium 120 at the frequency remote from the resonance frequency f0 at which tilt resonance does not occur, thereby adjusting the tilt of the optical information recording medium 120 with respect to tilt from the optical axis thereof (step S1).

Further, the control signal generating section 113 detects the returning light through the photodetector 106 in a state of focusing on the information recording layer of the optical information recording medium 120 without performing the tracking operation. The control signal generating section 113 calculates the amount of eccentricity by calculating the number of times (the number of times of traverse) when the track is traversed from the tracking error signal based on the returning light (step S2).

In the embodiment, the optical pickup device calculates in advance a correlation between oscillation in the tracking direction and a case of minimizing tilt oscillation caused by the oscillation. Then, when the maximum eccentricity on a format is present in the optical pickup device, the gain of the gain adjusting portion capable of canceling the effect of the eccentricity is determined. By applying a ratio of the maximum amount of eccentricity on the format to the current amount of eccentricity to a predetermined gain, an initial gain for adjustment (hereinafter referred to as an "initial gain") is set. In addition, the effect of the tilt oscillation deteriorates the jitter and the error rate, but the jitter is more directly affected by the tilt oscillation as compared with the error rate. Therefore, in the embodiment, the adjustment is performed on the basis of the jitter as an indication. It is apparent that the adjustment may be performed on the basis of the error rate as an indication.

After the end of the processing of step S2, the control signal generating section 113 rotates the optical information recording medium 120 at a frequency f1 which is closest to the resonance frequency f0 in the use of the optical pickup device (step S3). Then, the amount of eccentricity at that time is measured, thereby setting the gain at the time of starting the adjustment as the initial gain on the basis of the measured amount of eccentricity (step S4). For example, even in a case where the resonance frequency of the optical pickup device built in the notebook PC is 100 Hz, if the rotation frequency in terms of the use of the notebook PC is up to 80 Hz, the frequency f1 is set to 80 Hz. Further, in a case of the device which is available only at 100 Hz or more, the frequency f1 is set to 100 Hz or more.

It should be noted that the frequency f1 may be equal to the resonance frequency f0. Further, in this example, the frequency f1 closest to the resonance frequency f0 "in terms of use" is selected. However, selecting the frequency closest thereto "in terms of specification" of the optical pickup device may be allowed.

Here, the control signal generating section 113 determines whether or not the jitter is equal to or less than the target value, that is, a predetermined standard value (step S5). If the jitter is equal to or less than the target value, the procedure advances to the processing of step S8. In contrast, if the jitter is more than the target value, the procedure advances to the processing of step S6. The jitter is stored in the memory 122 for each measurement.

In the determination processing in step S5, if it is determined that the jitter is more than the target value, the control signal generating section 113 determines whether or not the jitter deteriorates as compared with that at the frequency f1 at the time of the previous measurement (step S6). If the jitter deteriorates, it is determined that the adjustment fails, and then the gain adjustment processing ends. In addition, if there is no data on the jitter at the previous measurement, the procedure advances to step S7.

When it is determined in the determination processing of step S6 that the jitter does not deteriorate, the control signal generating section 113 increases the gain [dB] (step S7). Originally, there is a first order correlation between the tracking driving signal and the tilt driving signal. However, when the correlation is intended to be controlled by the gain, in a direction of increasing the gain, the variation of the amplitude relative to the gain is large. Hence, the correction becomes excessive, and thus it is difficult to set a margin. For this reason, the initial gain is a value which is set such that the gain is insufficient. Accordingly, in the case where the jitter is equal to or less than the standard value, the gain is gradually increased.

Then, the control signal generating section 113 advances to the processing of step S5, and determines whether or not the jitter is equal to or less than the standard value. If the jitter becomes equal to or less than the standard value, the gain A1 at that time is stored in the memory 122 (step S8).

Next, the optical information recording medium 120 is rotated at a frequency f2 farthest from the resonance frequency f0 in use (step S9). Although the frequency f2 is arbitrary, as an example, it may be set to, for example, (f0)/2. Alternatively, in a case of the device only using a frequency greater than the resonance frequency f0, 2(f0) may be selected as the frequency f2 at the beginning. As can be seen from FIG. 3, when the frequency is half or double the resonance frequency, the tilt angle greatly decreases, and the Q value decreases.

The control signal generating section 113 measures the jitter on the basis of the setting of the stored gain, and determines whether or not the jitter is equal to or less than the target value, that is, in the standard value (step S10). If the jitter is equal to or less than the target value, the procedure advances to the processing of step S13. In contrast, if the jitter is more than the target value, the procedure advances to the processing of step S11.

If it is determined in the determination processing of step S10 that the jitter is more than the target value, the control signal generating section 113 determines whether or not the jitter deteriorates as compared with that at the frequency f2 at the time of the previous measurement (step S11). If the jitter deteriorates, it is determined that the adjustment fails, and then the gain adjustment processing ends. In addition, if there is no data on the jitter at the previous measurement, the procedure advances to step S12.

When it is determined in the determination processing of step S11 that the jitter does not deteriorate, the control signal generating section 113 decreases the gain [dB] (step S12). At this time, it is expected that the tilt oscillation suppressing section 117 performs over-correction and the jitter insufficiently decreases. Therefore, the gain is gradually decreased at this time.

Then, the control signal generating section 113 advances to the processing of step S10, and determines whether or not the jitter is equal to or less than the standard value. If the jitter becomes equal to or less than the standard value, the gain A2 at that time is stored in the memory 122 (step S13).

On the basis of the above-mentioned result, from the ratio of the difference between the frequency f1 close to the resonance frequency f0 and the frequency f2 remote therefrom to the difference between the gains at the respective frequencies, the control signal generating section 113 calculates the rotation frequency of the optical information recording medium 120 and the first order coefficient k $\{=(A1-A2)/(f1-f2)\}$ of the gain, and stores those in the memory (step S14). When this processing ends, the gain adjustment processing is completed.

The tilt oscillation suppressing section 117 is able to set the optimum gain of the tracking driving signal, which is used in the tilt oscillation suppression processing at the rotation frequency during the operation of the device, by using the first order coefficient k. Further, in the example of FIG. 6, the first order coefficient k is calculated by measuring two points of the frequencies f1 and f2. However, by measuring three or more points of frequencies, the first order coefficient between the measurement points may be calculated.

Measurement Data

Between the case of performing the tilt oscillation suppression processing according to the embodiment of the disclosure (after the oscillation suppression) and the case of not performing the processing (before the oscillation suppression), the respective tilt tolerances (allowances) thereof at the time of reproduction are compared with each other by using a standard disc of DVD-ROM (Digital Versatile Disc-Read Only Memory) and a disc with an eccentricity of 100 μm.

First, in the case of not performing the tilt oscillation suppression processing (before the oscillation suppression), the measurement data at the time of reproduction will be described.

Figure 7A:
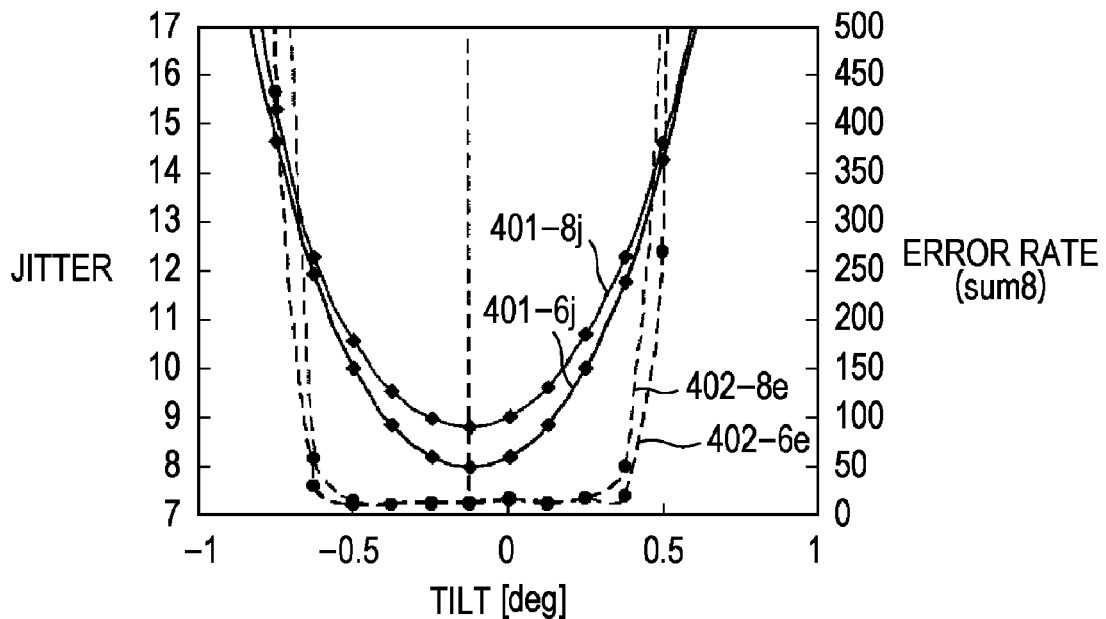
FIGS. 7A and 7B are graphs illustrating characteristics of the error rate and the jitter with respect to the tilt angle in the related art, where
Figure 7B:
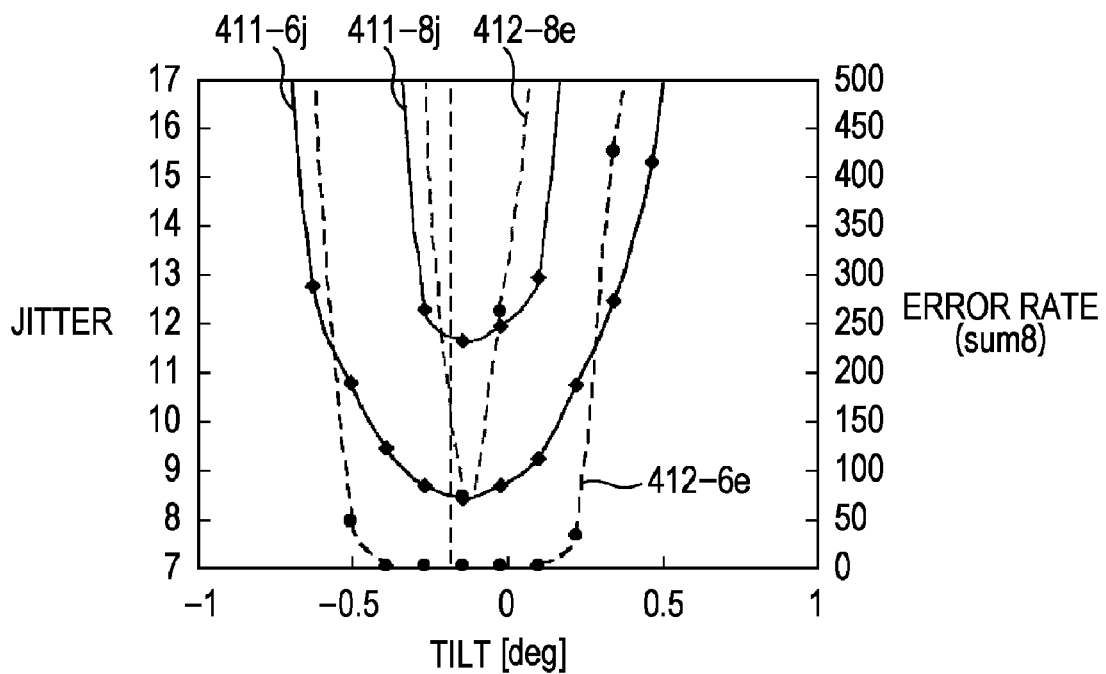

FIGS. 7A and 7B are graphs illustrating characteristics of the error rate and the jitter with respect to the tilt angle in the related art, where FIG. 7A shows the case of using the standard disc (an optical information recording medium with an eccentricity of approximately zero), and FIG. 7B shows the case of using the disc with the eccentricity of 100 μm. The solid line represents the characteristic of the jitter relative to the tilt angle, and the dashed line represents the characteristic of the error rate relative to the tilt angle. The measurement was performed at the 6-times speed and the 8-times speed when the angular velocity is constant (CAV: Constant Angular Velocity). It should be noted that the position of the line perpendicular to the parabolas near the minimum points of the parabolas represents an actual tilt angle of the optical pickup device measured before the start of the measurement experiment. Further, the measurement of the error rate is based on the Sum8 format.

In the case of the standard disc shown in FIG. 7A, the jitter at the maximum point of the jitter characteristic 401-8*j* at the 8-times speed is larger than the jitter at the maximum point of the jitter characteristic 401-6*j* at the 6-times speed. That is, as the rotation frequency becomes high, the jitter deteriorates. In contrast, it could be seen that there is no big difference between the error rate characteristic 402-8e at the 8-times speed and the error rate characteristic 402-6e at the 6-times speed.

In the case of the disc with the eccentricity of 100 μm shown in FIG. 7B, the change of the jitter characteristic 411-6j at the 6-times speed is small, as compared with that of the jitter characteristic 401-6j of the standard disc at the 6-times speed. However, the jitter characteristic 411-8j at the 8-times speed significantly deteriorates as compared with the jitter characteristic 401-8j of the standard disc at the 8-times speed. Likewise, the error rate characteristic 412-8e at the 8-times speed also significantly deteriorates as compared with the jitter characteristic 401-8e of the standard disc at the 8-times speed. The reason is that the resonance frequency of the optical pickup device is close to the rotation frequency.

Figure 8:
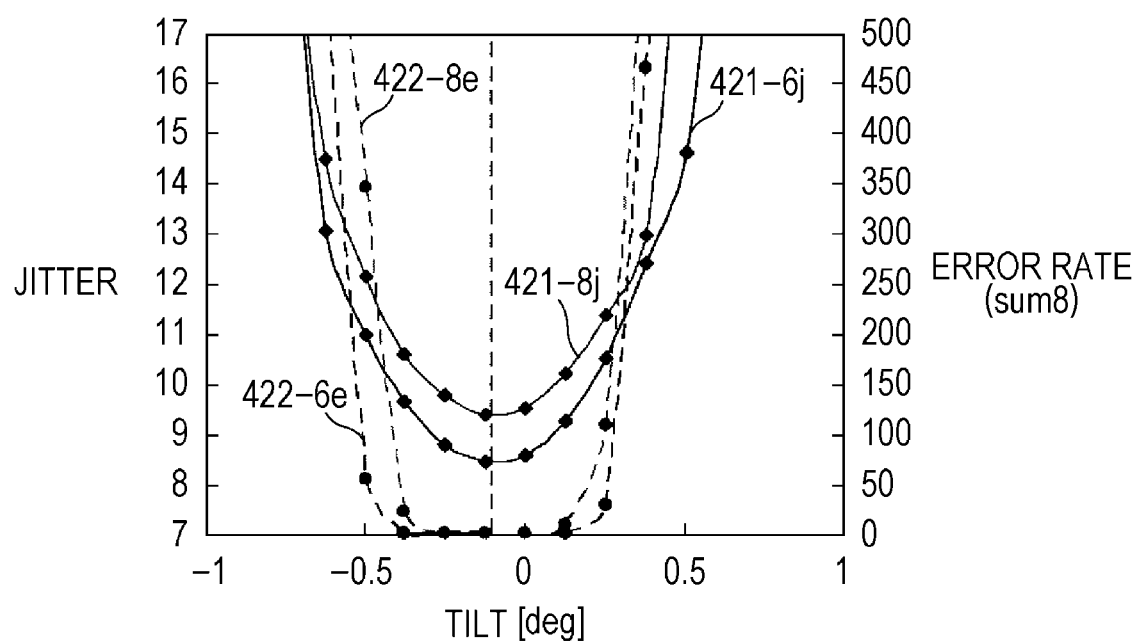
FIG. 8 is a graph illustrating characteristics of the error rate and the jitter with respect to the tilt angle after tilt oscillation suppression processing.

FIG. 8 is a graph illustrating characteristics of the error rate and the jitter with respect to the tilt angle after tilt oscillation suppression processing. The tilt oscillation suppression processing was performed by rotating the disc with the eccentricity of 100 μm at the 6-times speed and at the 8-times speed when the angular velocity is constant (CAV: Constant Angular Velocity).

In the graph after the tilt oscillation suppression processing shown in FIG. 8, the jitter characteristic 421-6j at the 6-times speed is hardly changed as compared with the jitter characteristic 411-6j at the 6-times speed in the case of not performing the tilt oscillation suppression processing (FIG. 7B). It is the same in the error rate characteristic 422-6e at the 6-times speed. On the other hand, it can be seen that the jitter characteristic 421-8j at the 8-times speed is greatly improved as compared with the jitter characteristic 411-8j at the 8-times speed in the case of not performing the tilt oscillation suppression processing (FIG. 7B). Likewise, the error rate characteristic 422-8e at the 8-times speed is greatly improved as compared with the error rate characteristic 412-8e at the 8-times speed in the case of not performing the tilt oscillation suppression processing (FIG. 7B). Although the tilt tolerance is slightly narrow, the tilt tolerance (allowance) substantially close to the 6-times speed is secured.

Figure 9:
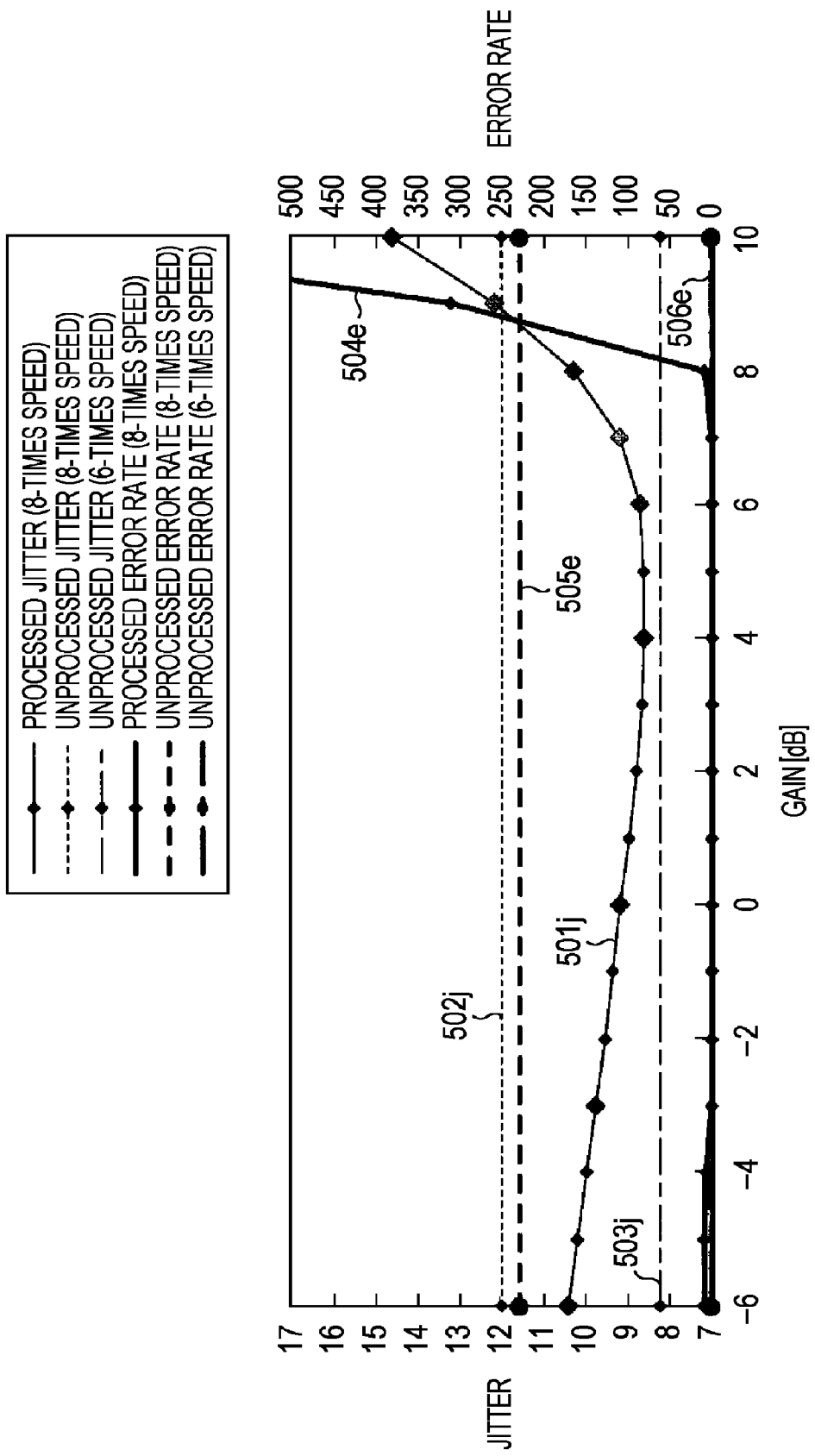
FIG. 9 is a graph illustrating a relationship (gain margin) between the gain, the jitter, and the error rate at the time of reproducing a DVD-ROM.

FIG. 9 is a graph illustrating a relationship (gain margin) between the gain, the jitter, and the error rate at the time of reproducing a DVD-ROM. The term "processed" means that the tilt oscillation suppression processing is completed, and the term "unprocessed" means that the tilt oscillation suppression processing is not performed. The measurement was performed by rotating DVD-ROM with an eccentricity of 100 μm at the 6-times speed and the 8-times speed when the angular velocity is constant (CAV: Constant Angular Velocity). Further, the measurement of the error rate is based on the PISUM8 format.

In the example of FIG. 9, when the gain is changed in the range of −6 [dB] to 10 [dB], in the range of about 9 [dB] or less, the processed jitter characteristic 501j at the 8-times speed is present between the unprocessed jitter characteristic 503j at the 6-times speed and the unprocessed jitter characteristic 502j at the 8-times speed. Further, in the example of FIG. 9, similarly to the case of the jitter, in the range of about 9 [dB] or less, the processed error rate characteristic 504e at the 8-times speed is present between the unprocessed error rate characteristic 506e at the 6-times speed and the unprocessed error rate characteristic 505e at the 8-times speed.

From the result of this measurement, it can be considered that the optimum value of the gain is in the vicinity of 4 to 5 [dB], but when over-correction is performed by exceeding the optimum value, reproduction quality rapidly deteriorates. When the target value of the gain is set in the vicinity of the minimum point of the processed jitter characteristic 501j at the 8-times speed, the margin (allowable range) in a direction of the over-correction is narrow. Hence, it is necessary to set the target value to a value which is slightly lowered. Accordingly, it is more preferable that by comparing the tilt tolerances (for example refer to FIGS. 7 and 8) in the range of, for example, −6 [dB] to 8 (or 9) [dB], the optimum value of the gain at the initial setting should be considered. In addition, it can be said that the gain range, which is obtained when the jitter is at an appropriate value, is substantially the same as the gain range which is obtained when the error rate is at an appropriate value.

Further, in the example of FIG. 9, the processed jitter characteristic 501j at the 8-times speed intersects with the unprocessed jitter characteristic 502j at the 8-times speed at about 9 [dB] and at about −11 [dB] which is not shown. That is, the characteristic has two upper limits of the standard value. The intermediate value between the two gain values corresponding to the two upper limits of the standard value in the processed jitter characteristic 501j at the 8-times speed is about −1 [dB]. In addition, the intermediate value is smaller than the gain value (4 to 5 [dB]), which is treated as the optimum, in the vicinity of the minimum point in the processed jitter characteristic 501j at the 8-times speed.

Further, the gain adjusting portion 202 may be configured to adjust the gain value around the gain value (4 to 5 [dB]), which is treated as the optimum, in the vicinity of the minimum point in the processed jitter characteristic 501j at the 8-times speed. For example, the gain value is adjusted in the range of the high gain value (about 9 [dB]) of the gain values, which correspond to the two upper limits of the standard value in the processed jitter characteristic 501j at the 8-times speed, to a low gain value which is lower, by a gain width between the gain value (4 to 5 [dB]) treated as the optimum and the high gain value, than the corresponding optimum gain value. That is, the gain value is adjusted by increasing or decreasing it from the gain value (4 to 5 [dB]), treated as the optimum, as the center by the gain width between the gain value treated as the optimum and the corresponding high gain value.

Furthermore, regarding the advantageous effect of the tilt oscillation suppression processing, checking as to whether it is possible to obtain the same advantageous effect as a DVD was performed even on a BD (Blu-ray Disc) of which the recording density is increased by employing a laser light with a shorter wavelength than that for a DVD as an optical disc in the related art. Therefore, the result thereof will be hereinafter described.

Figure 10A:
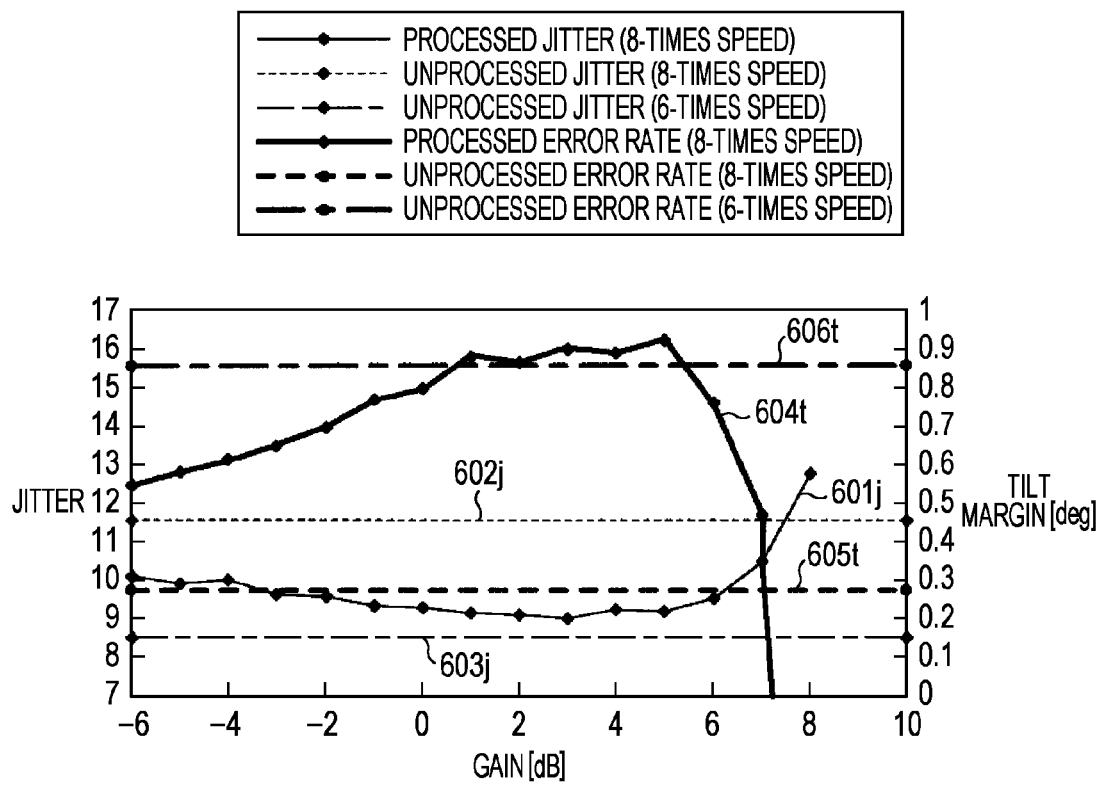
FIGS. 10A and 10B are graphs illustrating a relationship (gain margin) between the gain, the jitter, and the tilt margin, where
Figure 10B:
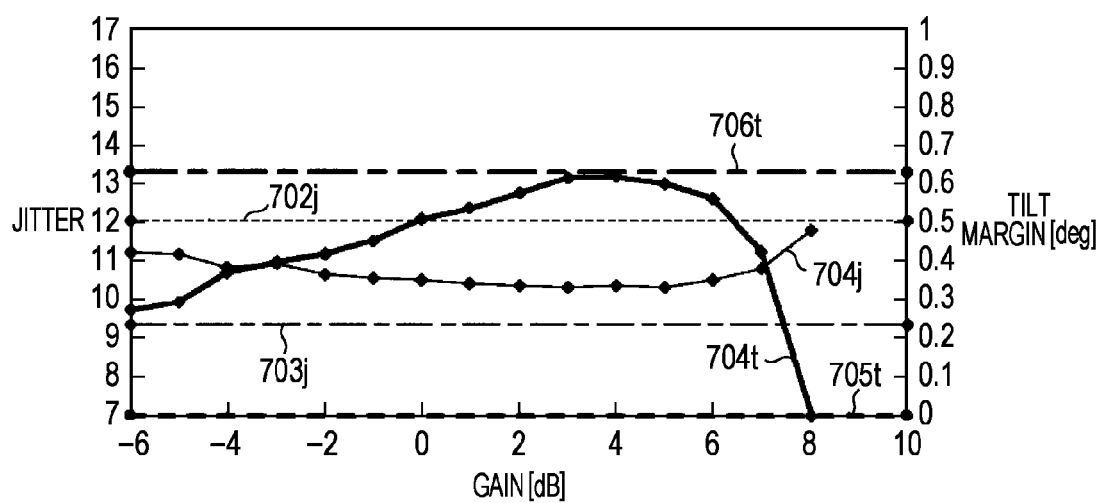

FIGS. 10A and 10B are graphs illustrating a relationship (gain margin) between the gain, the jitter, and the tilt margin at the time of reproduction, where FIG. 10A shows a case of a DVD-ROM and FIG. 10B shows a case of a DVD+RW. The tilt margin [deg] represents the tilt in the tilt direction with respect to the optical axis of the optical information recording medium. The measurement was performed by rotating the DVD-ROM and DVD+RW with eccentricities of 100 μm at the 6-times speed and the 8-times speed when the angular velocity is constant (CAV: Constant Angular Velocity).

In the example (DVD-ROM) of FIG. 10A, when the gain is changed in the range of −6 [dB] to 10 [dB], in the range of about 7.5 [dB] or less, the processed jitter characteristic 601j at the 8-times speed is present between the unprocessed jitter characteristic 603j at the 6-times speed and the unprocessed jitter characteristic 602j at the 8-times speed. Further, in the example of FIG. 10A, similarly to the case of the jitter, in the range of about 7 [dB] or less, the processed tilt margin characteristic 604t at the 8-times speed is present between the unprocessed tilt margin characteristic 606t at the 6-times speed and the unprocessed tilt margin characteristic 605t at the 8-times speed.

In the example (DVD+RW) of FIG. 10B, in the range of about 8 [dB] or less, the processed jitter characteristic 701j at the 8-times speed is present between the unprocessed jitter characteristic 703j at the 6-times speed and the unprocessed jitter characteristic 702j at the 8-times speed. Further, in the example of FIG. 10B, similarly to the case of the jitter, in the range of about 8 [dB] or less, the processed tilt margin characteristic 704t at the 8-times speed is present between the unprocessed tilt margin characteristic 706t at the 6-times speed and the unprocessed tilt margin characteristic 705t at the 8-times speed.

From the result of this measurement, it can be considered that, in each case of a DVD-ROM and a DVD+RW, the optimum value of the gain is in the vicinity of 3 to 4 [dB].

Figure 11:
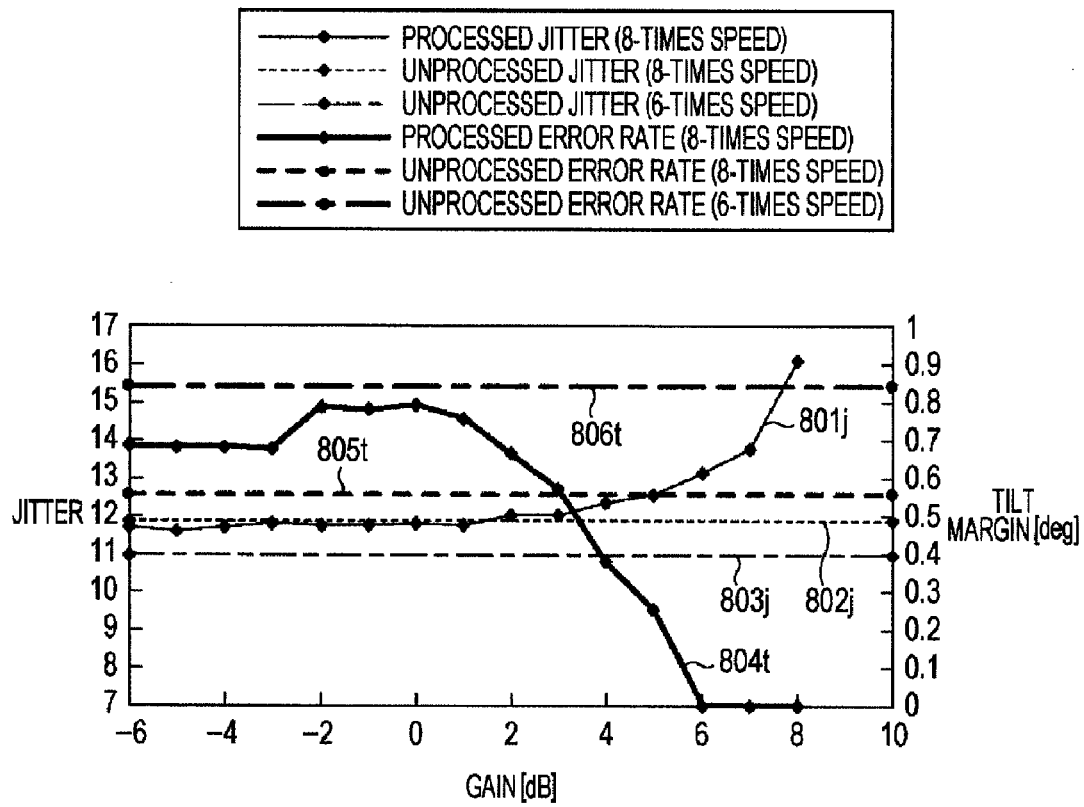
FIG. 11 is a graph illustrating a relationship (gain margin) between the gain, the jitter, and the tilt margin at the time of reproducing a BD-ROM.
Figure 12A:
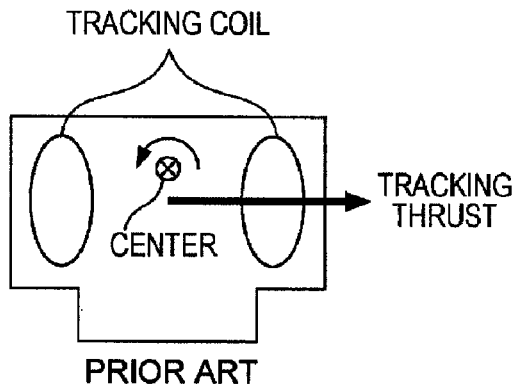
FIGS. 12A and 12B are diagrams illustrating the related art.
Figure 12B:
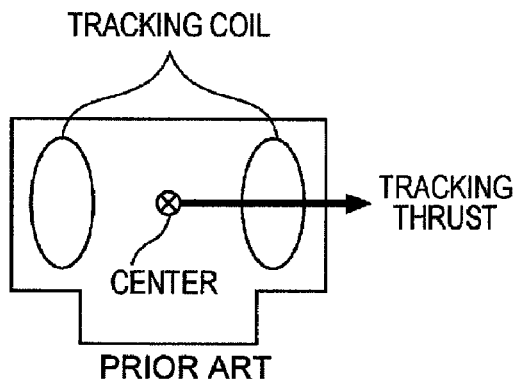

FIG. 11 is a graph illustrating a relationship (gain margin) between the gain, the jitter, and the tilt margin at the time of reproducing a BD-ROM. The measurement was performed by rotating a BD-ROM with an eccentricity of 75 μm at the 6-times speed and the 8-times speed when the angular velocity is constant (CAV: Constant Angular Velocity). Further, the measurement of the error rate is based on the SER format.

In the example (BD-ROM) of FIG. 11, when the gain is changed in the range of −6 [dB] to 10 [dB], in the range of about 2 [dB] or less, the processed jitter characteristic 801j at the 8-times speed is present between the unprocessed jitter characteristic 803j at the 6-times speed and the unprocessed jitter characteristic 802j at the 8-times speed. Further, in the example of FIG. 11, similarly to the case of the jitter, in the range of about 3 [dB] or less, the processed tilt margin characteristic 804t at the 8-times speed is present between the unprocessed tilt margin characteristic 806t at the 6-times speed and the unprocessed tilt margin characteristic 805t at the 8-times speed.

From the result of this measurement, it can be considered that, in the case of a BD-ROM, the optimum value of the gain is in the vicinity of −1 [dB]. In addition, in the case of a BD-ROM with an eccentricity of 100 μm, it was also possible to obtain the measurement result that the optimum value of the gain is in the vicinity of −1 [dB]. From the above, it could be seen that, in the tilt oscillation suppression processing, even in the case of a BD, it is possible to obtain the same advantageous effect as a DVD. In addition, it can be said that the gain range, which is obtained when the jitter is at an appropriate value, is substantially the same as the gain range which is obtained when the tilt margin is at an appropriate value.

According to the aforementioned embodiment, by using the first order correlation between the tracking driving signal and the tilt driving signal, the tracking driving signal is added to the tilt driving signal, and is supplied to the tilt actuator. Thereby, even in the case where the resonance frequency of the tilt actuator is close to the rotation frequency of the optical information recording medium, by eliminating the effect of the tracking oscillation, it is possible to suppress the tilt oscillation in the vicinity of the resonance frequency of the tilt actuator. Accordingly, it is possible to relax the restriction of the component structure necessary to accurately achieve a balance between the tracking operation point and the centroid of the tilt actuator. Further, the work to achieve the balance of the centroid of the tilt actuator at the time of manufacture is not necessary, and thus it is possible to achieve simplification.

Moreover, according to the aforementioned embodiment, by using the rotation frequency of the optical information recording medium and the first order coefficient k of the gain, the gain of the tracking driving signal added to the tilt driving signal is adjusted. Therefore, it is possible to achieve the tilt control without any particular detection mechanism or coefficient table.

Further, the aforementioned embodiment shows, as an example, the case where the optical information recording medium is rotated at CAV. However, the embodiment can also be applied even in a case where the linear velocity is constant (CLV: Constant Linear Velocity). By using the rotation frequency of the optical information recording medium and the first order coefficient k of the gain calculated in the embodiment, in response to the change of the rotation frequency depending on CLV, it is possible to adaptively adjust the gain.

2. Others

The aforementioned embodiment can be applied to various systems by setting the cut-off frequency in the filter portion 201 and the gain value of the tracking driving signal added to the tilt driving signal in the gain adjusting portion 202 as variables.

Further, the embodiment can also be similarly applied to the oscillation in the tilt direction caused by the oscillation in the focusing direction resulting from the surface wobbling of the optical information recording medium. Therefore, the embodiment is applicable by replacing the tracking driving signal in the aforementioned embodiment with the focus driving signal as it is.

Furthermore, in the aforementioned embodiment, a particular signal and a particular circuit is not necessary. Hence, the embodiment is not limited to the optical disc drive device, and can be applied to various systems which rotate discs. Accordingly, it is possible to suppress the oscillation in the tilt direction caused by the eccentricity of the disc.

In addition, in the present application, the processing steps, which describe time-series processing, include not only processing, which is chronologically performed in order of description, but also processing which is performed in parallel or individually although it is not always chronologically performed (for example, parallel processing or processing based on an object).

As described above, the disclosure is not limited to the aforementioned embodiments, and it is apparent that various modifications and variations may be made without departing from the technical scope of the appended claims of the disclosure.

The present disclosure contains subject matter related to that disclosed in Japanese Priority Patent Application JP 2010-135614 filed in the Japan Patent Office on Jun. 14, 2010, the entire contents of which are hereby incorporated by reference.

What is claimed is:

1. An optical pickup control circuit comprising an adding portion that adds a tracking driving signal, generated by a tracking driving section, for moving an objective lens, provided to face a discoid optical information recording medium, in a tracking direction of the corresponding optical information recording medium, to a tilt driving signal, generated by a tilt driving section for moving the corresponding objective lens in a tilt direction of the corresponding optical information recording medium, and supplies the added signal to a tilt actuator;

further comprising a gain adjusting portion that changes a gain value of the tracking driving signal in accordance with a rotation frequency of the optical information recording medium and supplies the changed gain value to the adding portion, wherein the gain adjusting portion changes the gain value of the tracking driving signal by using coefficients of a gain and the rotation frequency of the optical information recording medium, obtained from a ratio of the difference between a first set frequency and a second set frequency to a difference between the gain values at the first and second set frequencies.

2. The optical pickup control circuit according to claim 1, wherein the first frequency is an actually used frequency which is close or identical to a resonance frequency of the tilt actuator, and the second frequency is a frequency which is remote from the corresponding resonance frequency.

3. The optical pickup control circuit according to claim 2, wherein regarding a gain value corresponding to the first frequency and a gain value corresponding to the second frequency, jitters of reproduced signals, which are read out from the optical information recording medium at the respective gain values, are equal to or less than a predetermined standard value.

4. The optical pickup control circuit according to claim 3, wherein the gain value corresponding to the first frequency and the gain value corresponding to the second frequency are smaller than a gain value optimal to the rotation frequency of the optical information recording medium.

5. The optical pickup control circuit according to claim 4, wherein a jitter characteristic for the gain value at the first frequency (first frequency>second frequency) has two upper limits of the standard value, and an intermediate value between two gain values, which correspond to the two upper limits of the standard value in the corresponding jitter characteristic, is smaller than the optimal gain value.

6. The optical pickup control circuit according to claim 3, wherein a jitter characteristic for the gain value at the first frequency (first frequency>second frequency) has two upper limits of the standard value, and the gain adjusting portion adjusts a gain value between a high gain value of the gain values, which correspond to the two upper limits of the standard value in the corresponding jitter characteristic, and a low gain value which is lower, by a gain width between the high gain value and a gain value optimal to the rotation frequency of the optical information recording medium, than the corresponding optimal gain value.

7. The optical pickup control circuit according to claim 3, further comprising a filter portion that passes a frequency band component including the resonance frequency of the tilt actuator in the tracking driving signal and supplies the component to the gain adjusting portion.

8. The optical pickup control circuit according to claim 3, further comprising a polarity selecting portion that selects a polarity of a signal, which is output from the gain adjusting portion, on the basis of information for determining the polarity of the signal, which is output from the gain adjusting portion, in accordance with a position of a centroid of the tilt actuator.

9. The optical pickup control circuit according to claim 1, wherein the coefficients of the gain and the rotation frequency of the optical information recording medium, obtained from the ratio of the difference between the first frequency and the second frequency to the difference between the gain values at the first and second frequencies, are first order coefficients.

10. An optical disc drive device comprising:
an objective lens that is provided to face a discoid optical information recording medium;
a tracking actuator that moves the objective lens in a tracking direction of the optical information recording medium;
a tracking driving section that generates a tracking driving signal for moving the objective lens in the tracking direction of the optical information recording medium and supplies the signal to the tracking actuator;
a tilt actuator that moves the objective lens in a tilt direction of the optical information recording medium;
a tilt driving section that generates a tilt driving signal for moving the objective lens in the tilt direction of the optical infoiniation recording medium;
a tilt oscillation suppressing section that generates a tilt oscillation suppression signal by adding the tracking driving signal, which is generated in the tracking driving section, to the tilt driving signal, which is generated in the tilt driving section, and supplies the added signal to the tilt actuator; and
a gain adjusting portion the changes a gain value of the tracking driving signal in accordance with a rotation frequency of the optical information recording medium;
wherein the gain adjusting portion changes the gain value of the tracking driving signal by using coefficients of a gain and the rotation frequency of the optical information recording medium, obtained from a ratio of the difference between a first set frequency and a second set frequency to a difference between the gain values at the first and second set frequencies.

* * * * *